July 6, 1965  D. G. GREENLIE  3,193,127
CROWN CLOSURE SEALING DISC
Filed April 14, 1961

United States Patent Office 3,193,127
Patented July 6, 1965

3,193,127
CROWN CLOSURE SEALING DISC
David G. Greenlie, Weston, Mass., assignor to W. R. Grace & Co., Cambridge, Mass., a corporation of Connecticut
Filed Apr. 14, 1961, Ser. No. 103,120
10 Claims. (Cl. 215—39)

This invention relates to container closures such as crown, lug and screw caps. More particularly, this invention is concerned with a novel sealing disc or liner for such closures and its method of manufacture.

Composition cork discs have been used for many years as liners in container closures, particularly crown closures. Cork liners have many disadvantages, however. The cork granules used to form the composition cork disc are not available in the United States and must be imported. The granules are usually scrap from other cork-processing operations and the quality of the granules may vary widely. The cork granules in the disc are usually held together with a glue or bonding agent which imparts a taste to the contents of many packs. The agglomerate nature of a composition cork disc also permits moisture penetration and attack of the metal cap panel of crown closures. About 30 to 40 percent of the packs sealed with cork discs require that an additional protective panel or spot of aluminum or a vinyl plastic be used to reduce corrosion of the cap panel, contamination of the product by extractables from the composition cork and disintegration of the bond between the cork granules.

The sealing disc or crown liner of this invention does not have these disadvantages. It is made from readily available synthetic plastic materials, and uniform quality of the raw materials can be assured. That portion of the sealing disc exposed to the contents of the container is inert and contains essentially no extractables, i.e., it is odorless, tasteless and non-toxic. The panel portion is also essentially impermeable to the transfer of moisture and fully protects the panel of the cap from attack by the contents of the pack. The sealing disc of this invention presents a very pleasing appearance when the cap is removed from the container and may be tastefully tinted as desired.

One particular feature of the sealing disc of this invention is its unusual effectiveness even when relatively thin discs are used, e.g., a $\frac{1}{16}$ inch thick crown closure sealing disc of this invention has equalled or outperformed both plain and spotted cork seals, regardless of their thickness, from the standpoints of taste, instant pressure retention, long-term pressure retention and high pressure retention such as occurs during pasteurization. This exceptional performance is obtained with very modest raw material, manufacturing, and crown fabrication costs.

Another significant feature of this invention is that the sealing disc is derived from a preformed rod of such a nature that the sealing disc can be formed therefrom and inserted into caps and crowns by conventional cork cutting and insertion machinery. Other types of synthetic sealing discs that have been suggested by the art, such as preformed polyethylene seals, require major alteration or replacement of existing equipment. In addition, the sealing disc of this invention displays unusual hopper abuse resistance when crown closures, with the sealing discs inserted, are hoppered in the conventional manner during the capping operation.

In brief compass, the present invention is a prefabricated sealing disc for container closures, particularly crown closures, comprising an impervious panel portion or supporting structure of a fairly rigid but compressible monolithic or homogeneous, low density, foamed linear polymer such as a polystyrene which is essentially inert and has a non-interconnecting cell structure, and an outer adherent, relatively thin, substantially unstressed sealing ring of a deformable plastic or elastomer such as a polyvinyl chloride which also may be foamed or puffed to some extent. The panel portion preferably has a diameter greater than the diameter of the center of the lip of the container to which the closure is to be attached.

The foamed panel portion serves to position the outer elastomeric ring in the proper sealing position between the cap and the lip and constrains the ring during the capping operation when the outer sealing ring is being compressed and deformed. The functional features of positioning and constraint of the sealing ring by the panel portion are essential features of the sealing disc of this invention. The panel portion is formed from a low gravity, foamed polymer which is impervious to water but has poor sealing properties. The foamed plastic permits a very small amount of a usually more expensive (per unit of volume) polymer with good elastic recovery to be used in the liner while still obtaining an effective sealing action. The use of a foamed material in the panel portion results in a liner having some substance or ability to be handled, at a minimum cost of materials.

In addition, the foamed plastic panel of the disc effectively protects the cap with a minimum weight of material, i.e., the thickness of the panel if unfoamed would be 2 to $2\frac{1}{2}$ mils for a $\frac{1}{16}$ inch thick crown liner, and effective panel protection cannot be obtained at such low panel weights by other methods of lining crowns.

While the present invention is primarily concerned with the providing of a novel sealing disc or liner for crown closures, it will be apparent to those skilled in the art that the fundamental teaching of this invention—the cooperative use of two complementary synthetic materials or forms of the same material to provide an inexpensive but unusually effective gasketing system for static closures—has wider applicability and can be employed in other types of closures, particularly closures having a diameter under about 2 inches.

The low density collapsible foamed polymer is used as a disappearing scaffolding structure which facilitates ready handling and positioning of the thin elastomeric sealing ring during assembly of the closure. When the foamed polymer collapses, it serves to constrain or wedge the elastomeric ring in the desired position during capping and thereafter, which is particularly advantageous if the sealing material is capable of undergoing any appreciable plastic flow under the high pressures encountered during capping. The foamed plastic supporting structure readily falls away when the closure is fastened onto the container and allows the sealing ring to take the full closing force and develop a good seal. The foamed plastic preferably does not have any appreciable recovery properties, i.e. the ability to "spring back," and thus does not detract from the closing force being applied to the sealing ring. The cell wall structures of the foamed plastics used in the panel have the property of collapsing or fracturing when compressed with no or little tendency to recover. The foamed polystyrenes known to the art fairly uniquely meet these requirements. By way of comparison, while low density polystyrene has the property of collapsing without recovery, cork does not. The use of cork as the positioning and constraining member would result in a large part of the closing forcing being dissipated on the cork over a general area, rather than on the sealing ring to form a more linear area of contact.

The following discussion and description of the drawings attached to and forming a part of this specification will serve to make this invention clear.

Figure 1:
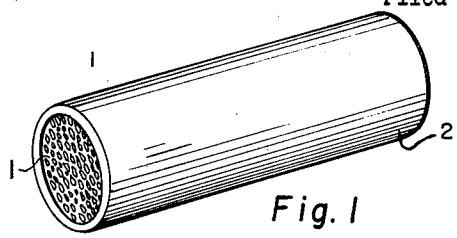
FIGURE 1 depicts a preformed rod from which the sealing disc of this invention can be formed.
Figure 2:
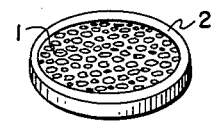
FIGURE 2 illustrates the sealing disc itself.

With reference to FIGURE 1, the preformed rod consists of a foamed plastic core 1, a thin adhesive coating, if necessary, thereon (not shown), and an outer elastomeric coating 2. FIGURE 2 shows a sealing disc of uniform thickness formed by slicing or cutting the rod perpendicular to its axis of revolution. The diameter of the core 1 and the radial thickness of the outer coating 2 will vary with intended use of the sealing disc. For common crown closures, the outside diameter of the rod may range from 0.950 to 1.080 inch, the diameter of the core may range from 0.750 to 0.950 inch and the radial thickness of the elastomeric coating may range from 0.025 to 0.080 inch. The rod may have any convenient length, e.g., 2 to 6 feet.

The cells or voids in the foamed panel portion are independant, i.e. not interconnecting, and the cell walls from a continuous structure which prevents flow of gas and liquid from cell to cell. Penetration by gases and vapors is very low. Penetration by non-solvent liquids is limited to the ruptured cells on the surface. The plastic of the panel portion is not capable of plastic flow below its softening point, e.g., about 180° F. for polystyrene. The plastic foam preferably has an initial density of less than ten pounds per cubic foot, and is thus relatively inexpensive. In a preferred embodiment of the invention, the panel portion overlaps the lip of the container and the contents of the container can come into contact with only the essentially inert polymer of the panel portion and do not have an opportunity to contact the elastomeric polymer of the outer ring which may contain some extractables.

The sealing discs are sliced or cut from the preformed rod in the same manner as cork discs are cut from composition cork rods. The discs may have a thickness in the range from 30 to 150 mils (0.001 inch equals one mil), depending on their use. Excellent performance in crown closures has been obtained from discs only 62 mils thick. The sealing discs of this thickness are easily able to contain at least 90 percent of an original 5 gas volumes in a carbonated water pack at 100° F. for several months. Such thin discs permit short-skirted crowns to be used with consequent savings in metal costs.

Figure 3:
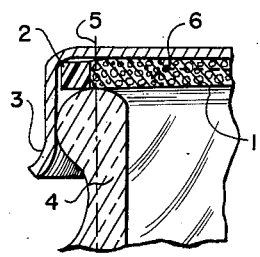
FIGURE 3 shows, in a cross-sectional view, a portion of a bottle and cap with a crown liner made according to this invention, positioned with respect to the lip of a container prior to the capping step.
Figure 4:
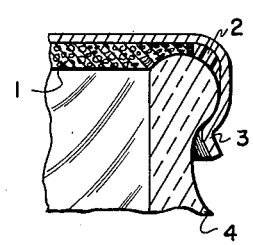
FIGURE 4 is similar to FIGURE 3 and shows the closure after it has been mechanically attached to the container.

FIGURE 3 illustrates the sealing disc of FIGURE 2 postioned within a cap 3 and superposed on the lip 4 of a container such as a beer bottle prior to the cap being attached to the bottle. The panel 1 extends beyond the center line 5 of the lip of the bottle. When cap 3 is pushed down on the bottle, the plastic foam of the panel readily compresses and gives or falls away such that the elastomeric ring 2 takes up the closing force and deforms. Its inward flow is prevented by the panel portion and thus it flows outwardly around the lip 4 tending to fill the corner of the cap and conform to the glass surface, as is shown in FIGURE 4. In many instances, it is desirable to adhesively secure only the foamed plastic panel portion of the disc to the cap. If the ring is also secured to the cap, its ability to flow and conform to the cap and lip may be reduced.

In its freshly prepared, fully expanded condition (4.3 to 4.7 pounds per cubic foot), foamed polystyrene has a weak compressive strength in the order of 120 to 180 pounds per square inch. During capping, the foam readily collapses between the lip of the container and the cap and allows the capping force to be taken up by the outer elastomeric ring, whereby the ring can develop its full sealing force. When the foam is compressed its compressive strength in the direction perpendicular to the force squeezing the foam, i.e., its resistance to the inward flow or fluid pressure of the elastomeric outer ring, greatly increases. It is preferred to use foams in the panel portion that are capable of being compressed to less than one-fifth of their original volume or increase in density at least five times when subjected to pressures encountered during the capping operation, e.g., 1,000 pounds per square inch or greater. The foamed plastic need not have the ability to recover or spring back after compression, but it is not detrimental if it has a slight amount of spring-back. This pinching and restraining of the edge of the foamed panel member between the container lip and cap helps develop the necessary resistance to inward flow of the outer elastomeric ring during capping, and causes the ring to be confined at the point where the most effective seal is obtained. As shown in the drawing, this might be termed "a corner seal," although placements other than precisely in the corner of the cap are contemplated.

The preformed rod shown in FIGURE 1 can be fabricated in several ways. A pre-sized core can be separately formed and the elastomeric coat can be placed thereon by dip coating, by slipping a preformed rubber sleeve or tube over the core, or by rolling or wrapping the core in a separately formed sheet of the elastomer. The latter procedure results in a joint or overlap and care must be taken to avoid having the joint interfere with the sealing performance of the disc. Alternatively, the preformed rod can be made by foaming the plastic core in situ within a preformed elastomeric tube, with the tube being confined if necessary in a suitable mold.

The method of preparation of the rod is preferably such that the elastomeric coating is not placed under any appreciable stress which could interfere with the performance of the disc cut from the rod.

It is much preferred to prepare the rod by extrusion molding the foamed plastic core, mechanically adjusting the size of the core as by grinding or rotary cutting which creates ruptured surface cells for improving bonding, applying an adhesive coat to the core, and finally extrusion coating the sized core with an elastomer. The extruded elastomer is preferably brought into intimate contact with the core by creating a slight vacuum beween the core and the elastomer tube during the extrusion.

Figure 5:
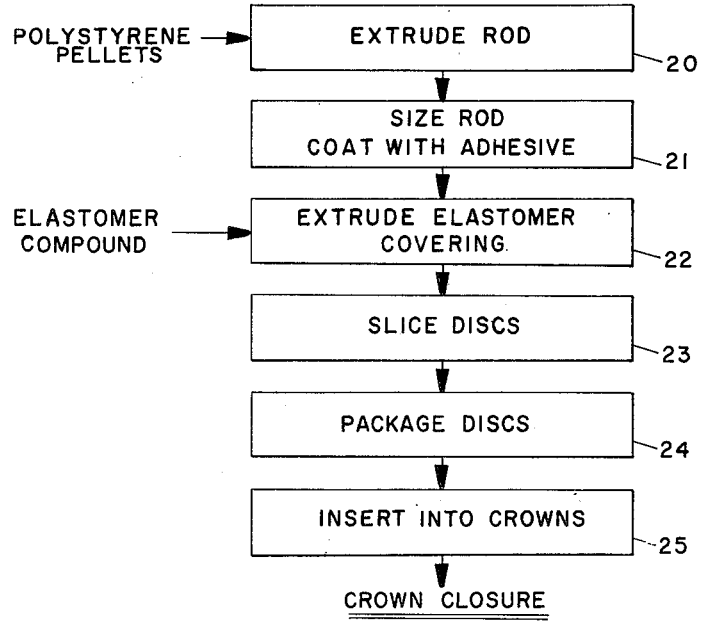
FIG. 5 schematically illustrates a preferred method of fabricating the sealing disc and crown closures therefrom. The same numbers are used to designate the same parts throughout the drawings.

More particularly, with reference to FIGURE 5, suitably compounded polystyrene pellets are introduced into an extrusion molding machine (Step 20) such as a Royle Number 1 extruder (John Royle & Sons, 2 inch extruder, 20/1 length to diameter ratio) and are heated, extruded and foamed as a continuous rod about 0.91 to 1 inch in diameter. The rod is then sized (Step 21) to about 0.9 inch diameter by being passed through a cork borer type of knife with a scrap breaker component. A machine customarily used to make wooden dowels has also been used to size the foamed rod. This sizing operation ruptures the surface cells of the foamed rod and permits better adhesion to be obtained between the foamed plastic and the elastomer.

An adhesive such as a rubber latex is sprayed onto the rod after sizing Step 21. The adhesive coated rod is dried and passed to a screw-type plastic extruder equipped with a cross-head for applying a tubular coating and coated (Step 22) with a 25 to 75 mil thick coating of an elastomer such as natural rubber at 300 to 310° F. A conventional wire cable coater (Davis-Standard Machine Company) has been used for this step. After cooling, which can be done with water sprays, the continuous rod is cut into convenient lengths, e.g., 36 inches.

These rods can be sold and shipped as such to a crown manufacturer who can then slice them into seals and insert them into the caps. Alternatively, the rods can be sliced at the point of manufacture (Step 23) using a machine such as composition cork slicing machine or cut-off knife and packed (Step 24) in loose form or in rolls for distribution.

The sliced discs so obtained can then be inserted (Step 25) into crowns or caps using convenient machinery and adhesives, e.g. egg and blood albumin, to form the final closure. These prefabricated sealing discs can be placed with either side in the cap. The central part of the panel portion of the sealing disc may be compressed during insertion into the cap as shown by dotted line 6 in FIGURE 3 if desired to give a denser more pleasing appearance to the seal or it may be embossed with a design or trademark. Some slight compression of the central portion of the seal will usually be desirable to obtain good contacting and bonding with the adhesive used to hold the disc in the cap.

The panel portion of the sealing disc, while compressible, should be substantially incapable of plastic flow under the conditions of capping, i.e., will not flow with pressures under 1000 pounds per square inch at a temperature of 150° F. The essential characteristics of the foamed plastic in the panel may be defined as follows:

Initial density—1.5 to 10 pounds per cubic foot
Compressed density—20 to 40 pounds per cubic foot
Compressive yield strength at initial density—50 to 180 pounds per square
Ultimate tensile at initial density—100 to 300 pounds per square inch
Void volume—70 to 98 percent, preferably 80 to 95 percent
Average size of cells—2 to 10 mils The polymer forming the continuous phase of the foam preferably has a softening point above 160° F. and a true density of 60 to 80 pounds per cubic foot. The polystyrene may be copolymerized with minor amounts of other monomers, such as divinyl benzene, to improve its properties. Dyes, plasticizers and fillers can be used if desired.

The foam can be formed in conventional manners as by beating air or other gas into a melt, by dissolving a solvent in the polymer which is volatile at the extrusion temperature, by using a heat decomposable finely divided solid gas generating agent in a liquid system (melt, dispersion, solution, and the like) or by forcing a normally gaseous agent into a melt of the polymer under pressure and extruding, with the latter being preferred. See, for example, United States Patent Numbers 2,669,751; 2,941,964; and 2,950,261.

The elastomer of the outer sealing ring is a deformable plastic, soft rubber or similar resin that will conform to the configuration of the crown and lip and develop the desired sealing force. The sealing force can be developed by the simple confining of the elastomeric material and also by its recovery properties. The elastomer can be an uncrosslinked or crosslinked (cured) high polymer. The nature of the elastomer used may be in part dictated by the fabricating conditions. For example, if a foamed-polystyrene rod is used as a core, it will not withstand temperatures much higher than 180° F. for any appreciable length of time; thus, if the elastomer is formed on the rod by dip coating, it may be difficult to secure a cured system at a temperature below 180° F. It has been found, however, that the elastomer can be applied to a polystyrene core coated with a hot melt adhesive at a temperature above 180° F., e.g., 310° F., without distorting the core, if the composite is thereafter fairly rapidly cooled.

The elastomer is preferably capable of undergoing some plastic flow at some pressure greater than 500 pounds per square inch at 72° F., which pressure may be greater than 1000 pounds per square inch for crown closures. In other applications such as in ketchup bottle caps and screw on baby food caps, it may be desirable to use a less deformable sealing ring. A softening point greater than 180° F., and an ASTM permanent set of less than 50 percent at 72° F. are preferred. By using suitable blowing agents, the elastomer can have a void volume of up to about 70 percent while still achieving the desired physical performance or properties. Suitable non-compatible lubricants which exude under compression can be incorporated into the elastomers, which is particularly desired when the sealing disc is to be used with rotatable closures.

The clue to good sealing action by the seal disc in crown closures where bad glass, inter alia, is a problem, appears to lie in the "fluid" behavior of the elastomer as the crowning pressure is exerted. The elastomer "flows" between the glass finish and crown and conforms to the lip of the container. After forming the seal, the gasketing material tends to undergo stress relaxation, i.e., it will initially support a load of say 1,000 pounds per square inch, which may drop to about 500 pounds per square inch after 24 hours. While the sealing material should be compounded to permit plastic flow under the capping pressure, it should have sufficient cohesiveness to prevent undue stress relaxation under the continuing pressure exerted by the cap, i.e., it should be capable of sustaining a contact pressure greater than 250 pounds per square inch at 72° F.

Natural rubbers, synthetic rubbers such as polybutadiene-styrene, polyisoprene, and butyl, vinyl polymers such as polyvinyl chlorides and similar materials can be used as the elastomer. Soft, deformable linear polymers such as polyethylene, polypropylene, and mixtures thereof are useful in some applications. The polymers may be compounded and applied to the foamed polystyrene cores as latices, emulsions, dispersions, melts and the like, or the elastomer can be preformed as by casting, calendering or extrusion and then applied to the core. The elastomer can be cured before being applied to the core, or can be wholly or partly cured (crosslinked) after application as by surface irradiation with beta rays or electrons.

*Examples*

Crown closures were made in the following manners:
Foamed polystyrene cores were prepared by cutting blocks about 12 inches long from commercially available foamed polystyrene plank (Dow HD–1 Styrofoam) and turning the blocks on a lathe down to 0.90 inch diameter. The foam had an uncompressed density of 4.5 pounds per cubic foot, an ultimate tensile of 185 pounds per square inch and a compressive yield strength of 140 pounds per square inch at the uncompressed density.

Five different types of coatings were applied to these rods to produce seals, designated for convenience as types A–1, A–2, B–1, B–2, and C.

The type A seals were fabricated by first coating the rods with a polyvinyl chloride adhesive (Goodrich's Geon 450x3 latex), drying at a 180° F. and then wrapping a cast sheet of the elastomer around the rods. The sheets (10 inches by 3⅛ inches) of a polyvinyl chloride plastisol were cast at 360° F. and applied to the rods at 300 to 350° F., after being heated in an oven, by rolling the sheets around the rods followed by water quenching. This produced a lap joint which gave satisfactory performance if sufficient care was taken.

The type A–1 seals were formed from sheets having a thickness of 0.021 inch, and the type A–2 from sheets having a thickness of 0.032 inch. The plastisol used for the type A seals had the following composition:

| | Parts by weight |
|---|---|
| Polyvinyl chloride resin | 33.0 |
| Dioctyl phthalate | 23.0 |
| Celogen (P,P'-oxybis (benzenesulfonyl hydrazide)) | 0.73 |
| Paraffin wax | 1.51 |
| Titanium dioxide | 1.71 |
| Super floss (diatomaceous earth, average particle size 2–4 microns) | 1.14 |
| Silica gel | 0.10 |
| Carbon black | 0.028 |
| Charcoal | 0.10 |

The type A–1 plastisol after fluxing had a density of 28.5 pounds per cubic foot, a compression modulus of 1260 pounds per square inch at 80 percent deflection (i.e. compression to 20 percent of its original thickness), a tensile modulus of 180 pounds per square inch at 100 percent elongation and an ultimate recovery of 21 percent after 1300 pounds per square inch compression, all as measured at 72° F.

This type A plastisol is also suited for the extrusion coating technique described in conjunction with FIGURE 4.

The type B seals were made by applying a 50 mil thick (final) dip coat of a rubber latex compound to the cores (previously coated with an adhesive) and drying at 130° F. The type B–1 seals were uncured and the type B–2 seals were cured by heating for 14 hours at 150° F.

The rubber latex compound used for the type B seals was a natural rubber latex modified with large amounts of barytes and asbestine. Iron oxide was used as the pigment, and small amounts of waxes, fatty acids and metallic soaps were used as plasticizers for the rubber. The liquid composition was stabilized with ammonium hydroxide, soaps, ammonium caseinate and commercial sorbitol.

The type C seals were made by dip coating a 0.75 inch diameter metal rod preheated to 375° F. with the above-identified plastisol to a thickness of 60 mils (final), curing at 350° F. and then cooling and stripping the coating from the metal rod. The sleeve so obtained was then slipped over the foamed polystyrene cores which had been previously coated with 0.1 mil of a polyvinyl chloride adhesive.

Discs were sliced from the rods using a rotary knife (i.e., a meat slicer). The discs were varied in thickness from 48 to 110 mils, with most being 62 mils. These sealing discs were inserted in standard short-skirted crowns using a polyvinyl chloride or a blood-egg albumin adhesive.

These crowns were tested on various packs including carbonated water, root beer, cola, orange drink, grape and phosphate of lime. Their performance was superior to spotted cork. Instant pressure retentions (standard brass bottle) in the range of 130 to 180 pounds per square inch were achieved before venting in practically all cases. This is the range desired for commercial operations. Instant pressure retentions over 200 pounds per square inch could be obtained if desired. The seals readily withstood pasteurization for 45 minutes at 140° F. at three volumes of carbon dioxide (water pack). Long-term pressure retentions after storage at 100° F. and 5 gas volumes (carbonated water) on coke and beer bottles were excellent. All the beer bottle samples retained at least 75 percent of the initial pressure after 3 months and 97 percent of them retained more than 98 percent of the initial pressure after 3 months.

Taste tests after hot storage established that the packs sealed with the sealing discs of this invention were much preferred over plain or spotted cork. They were completely free of the taste usually associated with composition cork because of the binders used with the cork.

The appearance of the discs after contact with cola, orange, grape, root beer, and similar packs was good. No absorption was noticeable but slight surface films formed on the white plastic by evaporation after opening the packs and were apparent in some cases. This coloring effect can be obscured by suitably coloring the disc.

Fresh crowns (i.e. not deburred) with the discs of this invention were tested for hopper abuse resistance by running 5000 of them through a standard hopper used to feed bottle capping machines. An equal number of aluminum spotted cork discs were tested in the hopper at the same time. The crowns were placed into the hopper, run through, collected and passed back through six times, with samples being retained each pass. Even with those samples which on a statistical basis represented that 0.0002 percent of the crowns which in commercial practice remain in the hopper for at least 15 minutes with continuous feed and withdrawal of crowns, surface damage was hardly visible with the discs of this invention whereas the aluminum spotted discs were badly scarred.

Designs other than that described for crown closures are contemplated. The central foamed plastic panel portion may be hollow for use in large diameter caps and/or when panel protection may not be needed. The elastomer sealing ring can be located on the inside of a hollow foamed plastic supporting member. This arrangement can be manufactured by spinning-in a liquid gasket forming composition within a hollow foamed plastic rod. The foamed plastic can be placed on both sides of the sealing ring, which is advantageous if it is desired to wedge the disc in a cap, or to effect a top seal rather than a corner seal. In all these arrangements, a preformed rod can be prepared from which the sealing disc can be sliced, with the foamed plastic thereafter serving to maintain the shape of the sealing ring, facilitating easy handling thereof, and to position the sealing ring when the disc is placed in the container closure.

Having described this invention, what is sought to be protected by Letters Patent is succinctly set forth in the following claims.

What is claimed is:

1. A sealing disc for a container closure comprising a circular supporting structure of a gas-impervious, fairly rigid, expanded, homogeneous, readily compressible polymer with a non-interconnecting cell structure capable of being compressed to less than one-fifth of its original volume and which will not exhibit plastic flow at a temperature below its softening point and an adherent circular, substantially unstressed, elastomeric sealing ring, said circular supporting structure serving to position said ring with respect to the sealing zone between said closure and the container.

2. The sealing disc of claim 1 wherein said closure is a crown closure, wherein said circular supporting structure is a continuous central panel portion having an outside diameter greater than the diameter of the center of the lip of said container, and wherein said elastomeric sealing ring is placed around the outer edge of the panel portion, said sealing disc having a thickness in the range of 30 to 150 mils.

3. The sealing disc of claim 1 wherein said polymer is a foamed polystyrene, and said elastomeric sealing ring is a puffed polyvinyl chloride.

4. A container closure comprising a crown adapted to be removeably mechanically attached to the lip of a container and a prefabricated disc seal centrally attached therein, said disc seal comprising a gas-impervious central panel portion of a highly foamed compressible polymer with a non-interconnecting cell structure capable of being compressed to less than one-fifth of its original volume and which will not exhibit plastic flow at a temperature below its softening point and an outer ring attached to said panel falling beyond the diameter of the center of said lip and comprising an unstressed elastomer capable of some plastic flow at the conditions of attachment of said crown to the container; the rigidity of said panel portion when collapsed being sufficient to prevent inward radial flow of said outer ring during attachment.

5. A prefabricated seal for crown closures comprising: a gas-impervious panel formed from a low density expanded compressible vinyl aromatic polymer with an independent cell structure, and an adherent substantially unstressed elastomeric sealing ring around the edge thereof, said sealing ring consisting of an elastomeric polymer capable of plastic flow at a pressure about 500 pounds per square inch and of sustaining a contact pressure greater than 250 pounds per square inch, both at 72° F., and said panel being capable of compression to less than one-fifth of its original volume during the capping operation and incapable of plastic flow at a temperature below its softening point.

6. A composite rod suitable for slicing into thin circular sealing discs for container closures comprising a monolithic core having a density less than 10 pounds per cubic foot and composed of a compressible, expanded, essentially odorless, tasteless, nontoxic and water-impermeable linear polymer having an independent cell structure capable of being compressed to less than one-fifth of its original volume and which will not exhibit plastic flow at a temperature below its softening point and an adherent, relatively thin substantially unstressed ring of an elastomer thereon.

7. The composite rod of claim 6 wherein said linear polymer is a foamed polystyrene, and said elastomer is a puffed polyvinyl chloride.

8. The rod of claim 7 wherein the surface of said core has a ruptured cell structure which improves adhesion between said core and said ring.

9. The rod of claim 6 when adapted to form seals for crown closures, the core of said rod having a diameter greater than the diameter of the center of the lip of the container to which the closure is to be attached.

10. A sealing disc having a thickness in the range of 30 to 150 mils and formed from the rod of claim 9 by slicing said rod perpendicularly to its axis of revolution.

References Cited by the Examiner
UNITED STATES PATENTS

| | | | |
|---|---|---|---|
| 1,978,163 | 10/34 | Megow | 18—59 |
| 2,023,268 | 12/35 | Dodge | 277—228 X |
| 2,149,532 | 3/39 | McManus | 18—59 |
| 2,149,533 | 3/39 | McManus | 215—40 |
| 2,357,581 | 9/44 | Curran | 277—234 |
| 2,438,671 | 3/48 | Marana | 277—234 |
| 2,737,503 | 3/56 | Sprague et al. | |
| 2,942,301 | 6/60 | Price et al. | |

THERON E. CONDON, *Primary Examiner.*

WALTER A. SCHEEL, GEORGE O. RALSTON,
*Examiners.*